May 14, 1935.  W. H. BAGLEY, JR  2,001,562
MOTOR MOUNTING
Filed March 25, 1933  2 Sheets-Sheet 2
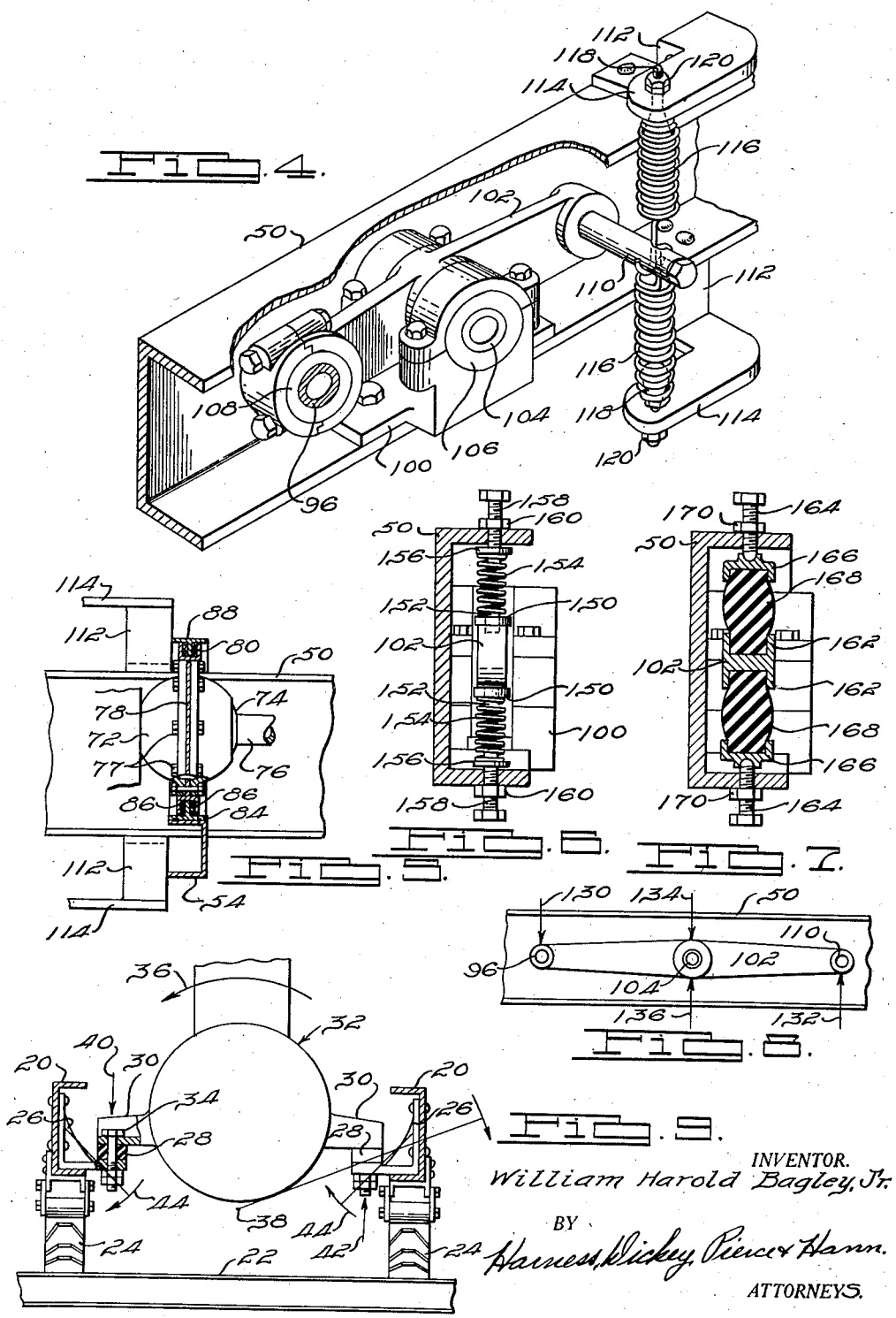
INVENTOR.
William Harold Bagley, Jr.
BY
ATTORNEYS.

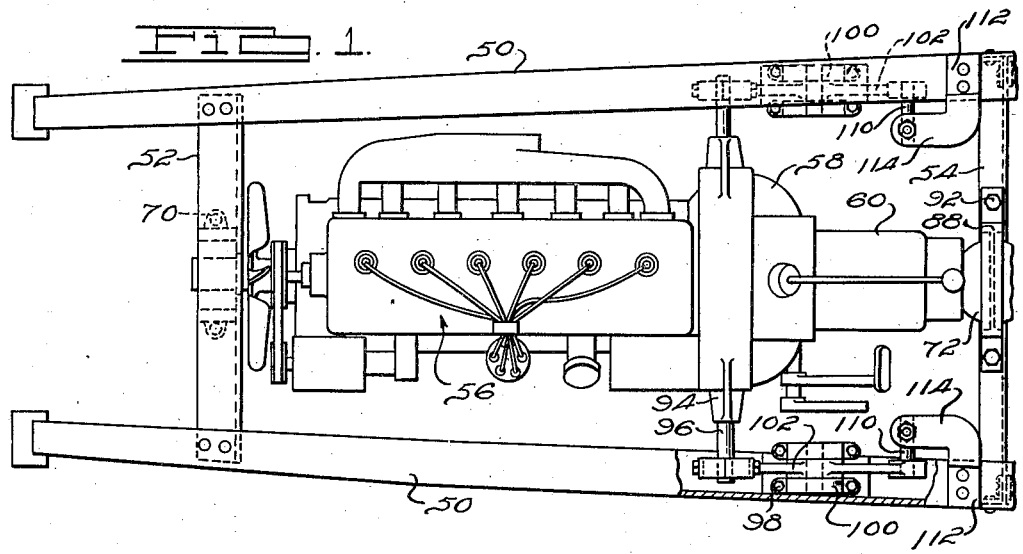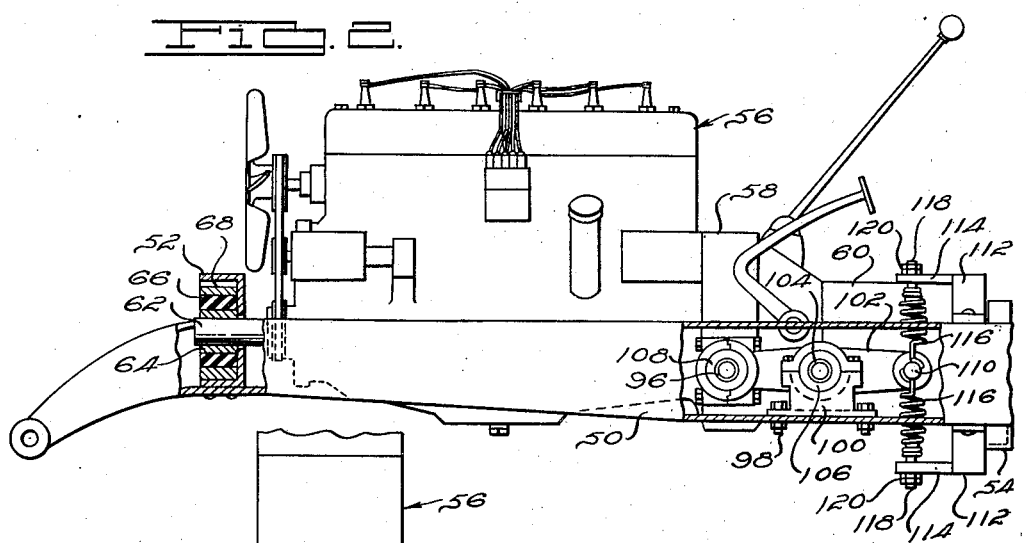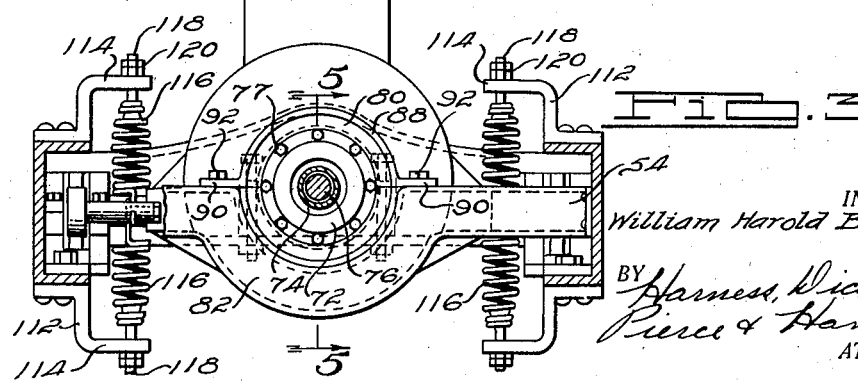

Patented May 14, 1935

2,001,562

UNITED STATES PATENT OFFICE 2,001,562

MOTOR MOUNTING

William Harold Bagley, Jr., Detroit, Mich., assignor of thirty per cent to James A. Bent and thirty per cent to Ralph J. Welch, both of Detroit, Mich.

Application March 25, 1933, Serial No. 662,685

13 Claims. (Cl. 248—14.2)

This invention relates to means for mounting engines or other machines on their supporting frames or bases in such a manner as to substantially prevent vibratory movement thereof due to torque reactions from being apparent in the supporting frames or bases, and is a continuation in part of my application for Letters Patent of the United States filed by me erroneously under the name of Harold Bagley, on the 19th day of November, 1932, Serial Number 643,441, for Improvements in structures for supporting engines in motor vehicles.

The invention contemplates particularly the mounting of engines on vehicle frames by means so designed as to substantially eliminate the effect of torque reactions between the engine and the frame from being apparent to those in the vehicle, and particularly to such a means wherein vibratory movement of the engine resulting from torque reactions is caused to set up opposed couples in the frame itself which offset each other and which, accordingly, eliminates their effect from being sensibly apparent in the frame and parts carried thereby.

An object of the invention is to mount an engine or other machine subject to torque reactions for pivotal movement, whereby the engine or other machine may move more or less freely under the force of such reactions, together with suitable means for limiting the pivotal movement of the engine or other machine and absorbing the force of such reactions.

Another object is the provision of means in a pivotally mounted engine or other machine subject to torque reactions whereby the force of such reactions is transmitted to its supporting means in a plane angularly disposed with respect to the direction in which the force is exerted in the engine.

Another object is the provision of means for mounting an engine in a motor vehicle for pivotal movement about a line extending longitudinally of the engine, and providing a connection between the engine and the frame of the vehicle for maintaining the engine in its approximately normal position and such that the force of the torque reactions in the engine set up opposed couples in the vertical plane of the vehicle frame side members.

Another object is the provision of means for pivotally supporting the engine of a motor vehicle in the frame of the vehicle for pivotal movement about a line extending in a generally longitudinal direction with respect to the engine, and providing a connection between the engine and the frame for maintaining the engine in approximately its normal position, including a double armed lever mounted for pivotal movement in a vertical plane approximately parallel to the frame side member of the vehicle and in the vertical plane of the frame side member, and yieldably urged toward a predetermined pivotal position.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views—

Fig. 1 is a fragmentary partially broken plan view of a portion of a motor vehicle chassis showing an internal combustion engine mounted therein in accordance with the present invention.

Fig. 2 is a partially broken, partially sectioned side elevational view of the mechanism illustrated in Fig. 1.

Fig. 3 is a vertical sectional view of the mechanism illustrated in Figs. 1 and 2 and taken in the plane approximately corresponding with the right hand end of the mechanism shown in those figures.

Fig. 4 is an enlarged, fragmentary, partially broken perspective view of one of the torque reaction dampening members supported on the frame of the vehicle shown in the preceding views.

Fig. 5 is a fragmentary vertical sectional view taken through the motor rear support as on the line 5—5 of Fig. 3.

Fig. 6 is an enlarged vertical sectional view taken perpendicularly through a chassis frame side member and illustrating a slightly different form of the construction illustrated in Fig. 4.

Fig. 7 is a view similar to Fig. 6 illustrating another modified form of construction.

Fig. 8 is a more or less diagrammatic sketch illustrating the forces set up in the frame of the vehicle due to the torque reactions of the engine in accordance with the present invention.

Fig. 9 is a more or less diagrammatic sketch illustrating the effect of torque reactions in the engines and frame of motor vehicles of conventional construction.

Engines having crank shafts rotated by reciprocating pistons, in common use in motor vehicles, are subject to bodily vibrations of relatively small amplitude but relatively great intensity due to causes inherent in their operation. All internal combustion engines of the piston type are subject to vibrations or oscillations about an axis coincident with the crank shaft axis, owing to so-called torque reaction. Torque reaction, as is well understood, is due to two causes, one of which arises as a result of the pressure of the expanding gas between the cylinder heads and the pistons, which applies an equal and opposite force to the cylinder block and crank pin and tends to rotate the block about the crank shaft axis. This is present at all speeds, and particularly at low speeds tends to produce a very marked and intense bodily vibration of the engine. The other cause is piston inertia, or the reactive force applied to the revolving crank pins and cylinder block during the effort of a crank pin to accelerate the piston after it has finished its stroke in one direction, and enters upon and continues its stroke in the opposite direction, the force of the revolving crank pins being then applied obliquely through the connecting rod and piston to the cylinder block, thus tending to rock the latter toward the right hand side if the crank shaft rotates clockwise, or toward the left if the crank shaft rotates counter-clockwise. Torque reaction due to the piston inertia is slight at low speeds and increases in proportion to acceleration.

There are other conditions of engine operation and design that also tend to cause vibration of the engine, but as these vibrations are of relatively small amplitudes and usually active in a vertical plane including the axis of the engine crankshaft, they may usually be effectively insulated from sensible transmission to the vehicle frame by floating the engine support by a sheet or block of rubber in a conventional and well known manner and, accordingly, such vibrations will not be considered herein and it will be understood that they may be taken care of in the manner described, if desired, in addition to the means herein provided for eliminating the effect of the torque reactions from being transmitted to the frame of the vehicle in such a manner as to sensibly affect the occupants thereof.

It has long been known in the art that the effect of torque reactions, and particularly those of the first order, may be materially lessened in their sensible transmission to the vehicle frame by pivotally supporting the engine in the frame for movement about a line substantially parallel to the crankshaft of the engine, and particularly about the engine crankshaft, and resiliently resisting the pivotal movement of the engine whereby it is allowed a limited amount of rocking movement with respect to the frame under the influence of such forces. The pivotal support for the engine in such case may be provided either by supporting it through suitable pivotal bearings of well known construction, or by supporting the engine on blocks of rubber or the like which will yield sufficiently under the torque reactions of the engine to permit the required rocking movement to effect the desired result. The effective force of the torque reactions in such case on the frame is reduced because of the fact that in allowing the engine to pivot under their force, a greater time element is provided for their transmission to the frame, and consequently the intensity of the force acting on the frame is materially reduced. However, it has been my observation that, although in such previously suggested constructions the effect of the torque reactions on the frame is materially reduced, such constructions have not wholly eliminated the sensible effect of such reactions in the frame chiefly for the reason that such prior constructions have been such that the forces transmitted to the frame side members have tended to twist each frame side member about its longitudinal centerline, thus setting up a corresponding vibrational movement of the frame side member which is sensibly apparent to the occupant of the vehicle.

By way of illustrating the effect of torque reactions on an engine of conventional construction and mounting in a motor vehicle, I have indicated in Fig. 9 a motor vehicle having chassis frame side rails 20 supported from an axle 22 by leaf springs 24 in accordance with conventional practice. Motor supporting brackets 26 suitably secured to the frame side members 20 project inwardly therefrom and may receive, for instance, a rubber block 28 at their inner ends upon which the supporting arms 30 of the engine 32 rest to thereby support the engine. Bolts 34 are provided between the brackets 26 and arm 30 to prevent relative lateral displacement between these members. Let it be supposed that the torque reactions in the engine tend to rotate the engine in the direction of the arrow 36. In such case the torque reaction of the primary type will tend to rotate the engine and frame as a whole relative to the axle 22, and the springs 24 will yield to some extent so as to permit a certain amount of pivotal movement of the frame and engine with respect to the axle about some such point as 38. The rubber block 28, in yielding to such torque reactions, will of course permit a certain amount of pivotal movement of the engine 32 independently of the frame side members 20 about some line such as, for instance, the axis of the crankshaft of the engine, and this movement will aid in reducing the effect of such torque reaction apparent in the frame side members 20. However, these last mentioned torque reactions in being transmitted from the engine to the frame will act downwardly in the direction of the arrow 40 on the left hand side and upwardly in the direction of the arrow 42 on the right hand side, tending to depress the left hand side of the frame to raise the right hand side of the frame and, at the same time, will act in the direction of the arrow 44 to twist the left hand frame in a clockwise direction, and it is this particular feature of construction heretofore disclosed that the present invention is particularly designed to eliminate. Obviously, any other engine supporting structure in which the point of connection between the frame and the engine is outside of the vertical plane of the frame side members, will cause any equivalent twisting effect on the frame side members.

Referring now to the drawings and particularly to Figs. 1, 2 and 3, a vehicle chassis frame is indicated having side rails 50 and cross members 52 and 54. Supported between the cross members 52 and 54 is a power plant of conventional construction including an internal combustion engine 56 having a clutch housing 58 and transmission housing 60 in longitudinal extension thereof. Although the power plant may be supported in the frame for rocking movement by means of rubber blocks, as previously mentioned, in the drawings, by way of illustration of one suitable means, it is shown supported in bearing structures. Accordingly, a tubular extension member 62 is fixed relative to the crankcase of the engine 56 in concentric relationship with respect to the axis of the crankshaft (not shown) thereof and projects forwardly from the front end of the engine and is rotatably received within a journal member 64. Such journal member, as previously described may, if desired, be supported through a block or pad of rubber from the frame, and accordingly in the drawings is shown as being surrounded by a ring 66 of rubber embraced in a bracket member 68 received within and secured to the front cross member 52 as by means of rivets 70.

The support for the rear end of the motor is shown of a type particularly adaptable for use in connection with motor vehicles of the torque tube type and, accordingly, is so constructed as to be capable of transmitting through it the driving and braking efforts from the road wheels to the vehicle frame. As indicated best in Figs. 3 and 5, there is fixed to the rear end of the transmission casing 60 a partially spherical hollow member 72 within which is received a spherically shaped front end portion 74 of a torque tube 76 for universal movement with respect thereto, it being understood that the universal joint (not shown) which connects the propeller shaft (not shown) to the transmission shaft (not shown) is housed within the members 72 and 74 in accordance with conventional practice.

Referring now particularly to Fig. 5, it will be noted that the member 72 is made up of two parts separated from each other in a plane passing through the center of the sphere, and clamped between these two parts as by bolts 77, is an annular member 78 formed to provide a peripheral outwardly opening channel rim 80. As best illustrated in Fig. 3, the central portion of the cross member 54 is downwardly depressed as at 82 so as to form an upwardly opening semi-cylindrical recess therein of slightly greater diameter than the diameter of the rim 80, and fixed to its upper surface over substantially the length of this recess is a semi-cylindrical member 84 of T-shaped section, the head of the T lying in contact with the upper surface of the cross member 54, although it may be insulated from it by a pad of rubber if desired as before suggested. The leg of the T projects radially inwardly of the head into the corresponding portion of the channel 80. Anti-friction thrust rings 86, preferably of fabric or other non-metallic material, are interposed between the leg of the member 84 and opposed faces of the channel 80 so as to limit axial movement between the members 78 and 84 and yet permit relative rotational movement between them. A semi-cylindrical strap member 88 of a section corresponding to the section of the member 84 and having the leg of the T received within the channel 80 and spaced from the side wall thereof by continuations of the members 86, is provided with oppositely extending terminal lugs 90 (see Fig. 3) which cooperate with bolts 92 to secure the member 88 to the cross member 54 and thereby maintain the rear end of the power unit against undesired vertical displacement. As will be recognized, with this construction the rear end of the motor is supported for rotational movement and yet so maintained against axial movement that it may suitably transmit through it the driving and braking efforts of the rear road wheels to the vehicle frame.

From the description thus far given, it will be apparent that a motor vehicle has been provided in which the engine is mounted for pivotal or rotational movement in the vehicle frame about the axis of its crankshaft. The means for limiting this pivotal movement and for preventing the force of such movement from being sensibly transmitted to the frame will now be described.

Although one device may be provided for accomplishing this purpose, and located entirely upon one side of the engine, particularly where the engine is provided with an independent rear support as in the case shown, two of such devices are preferably employed, one on each side of the engine, and in such case it will be apparent particularly where the engine is of relatively light construction, such two devices may also serve to support the rear end of the engine for limited rotational movement as well as to serve the function of dampening such movement. As both of such devices are identical in form except possibly as to reversal of shape in some details, only one of such devices will be described in detail.

As best indicated in Fig. 1 there is fixed in a boss 94 formed integrally with the clutch housing 58 on the side thereof, an outwardly extending tubular arm 96 which projects within the channel of the corresponding side frame member 50. As best indicated in Figs. 2 and 4, a bifurcated bracket 100 is secured as by bolts 98 to the lower flange of the frame side member 50 within the channel thereof and rearwardly spaced a slight distance from the projecting end of the arm 96. Pivotally mounted between its ends in the bracket member 100 for movement in a vertical plane is a two armed lever 102. Although any suitable type of pivotal connection between the bracket 100 and the lever 102 may be employed in the broader aspects of the present invention, such connections preferably include a shaft or pivot pin 104 fixed to the lever 102 and supported at its outer ends in rubber bushing 106 suitably secured in the bracket 100. The rubber bushings 106 are preferably so secured to both the bracket 100 and the pin 104 as to prevent relative slipping between them, so that the rubber of the rings 106 will be subjected to a shearing force upon pivotal movement of the lever 102. A similar connection including a rubber ring 108 is provided between the forward end of the lever 102 and the arm 96 projecting out from the motor but, as will be apparent, in this case the rubber ring 108 not only allows for relative rotational movement between the parts, but also permits a limited amount of such universal and lateral movement between them as may be necessary during operative running conditions of the engine and vehicle.

The rear end of the lever 102 is provided with a fixed pin 110 which projects inwardly therefrom in a horizontal direction. Upper and lower bracket members 112 are fixed to the upper and lower faces respectively of the corresponding chassis side frame member 50 and each is provided with a terminal portion 114 extending into over and under lapping relation respectively with respect to the inner end of the pin 110. A coil spring 116 is stretched between each end 114 and the pin 110 and is normally maintained under tension in this position. In the particular construction shown the outer end of each of the springs 116 is provided with a threaded terminal portion 118 which projects through the corresponding end 114 and is threadably engaged by nuts 120 which may be adjusted to vary the tension of the springs 116 and the normal pivotal position of the arm 102. The tension of the springs 116 is preferably so adjusted as to maintain the engine 56 in its normal gravitational position when at rest.

With the above described construction it will be obvious that any rotational movement of the motor about its end supports will cause a corresponding movement of the arm 96, and such movement of the arm 96 will tend to impart a pivotal movement of the lever 102 about the axis of its pivot pin 104. Such movement of the lever 102 and consequently rotational movement of the engine will be resisted mainly by one or the other of the springs 116, and to a lesser extent by the stresses set up in the rubber rings 106 and 108. The amount of such resistance will, of course, mainly depend upon the relative strength of the springs 116 and the degree to which they have been tensioned, and it will be apparent the particular properties of the springs 116 best suited for operating conditions to effect the desired result is best determined by experimentation in each particular case.

Referring now to Fig. 8, the action of the above dampening means will be described. This figure diagrammatically illustrates the construction shown in Fig. 4 in side elevation. Let it be assumed that the torque reaction in the engine 56 tends to rotate the engine in its pivotal supports on the frame and through the arm 96 exert a force in a downwardly direction indicated by the arrow 130 on the left hand end of the lever 102. This force will attempt to rotate the lever 102 in a counter-clockwise direction about the pivot pin 104, in the diagram illustrated, and consequently will tend to raise the right hand end of the lever 102. The lever 102 will rotate about the pin 104 under the influence of the force acting in the direction of the arrow 130 until the spring 116 between the pin 110 and the lower flange of the frame 50 is stressed to such an extent as to balance the force. Once this balance is effected the spring 116 will thus exert a force in the direction of the arrow 132 of equal intensity and in the opposite direction to the force acting along the arrow 130. Accordingly, as far as these forces are concerned, acting at the points indicated, they will balance themselves out once equilibrium is established. However, and for ease of description considering that equilibrium has been established between the forces 130 and 132, the force 130 will be transmitted to the frame side member 50 through the center of the lever in the direction of the arrow 134, and movement of this portion of the lever 102 in a downwardly direction will be resisted by an equal and opposite force acting through the pin 104 in the direction of the arrow 136. The pin 104 being fixed relative to the frame side rail 50, and the right hand end of the lever 102 being considered at least temporarily fixed with respect to the frame side member 50 through the medium of the lower spring 116, it will be observed that the resulting reaction between these two points will tend to rotate the frame side rail 50 in the direction of its longitudinal axis and in a vertical plane, about the pin 104 as an axis. Because of the fact that such frame side members 50 are designed to resist enormously greater forces in this direction than any torque reaction capable of being produced by the engine of the vehicle, no deflection of the frame side member 50 will result or be apparent and, consequently, any possibility of resulting vibration in the frame due to twisting effect of the frame side rails, as explained in connection with Fig. 9, is definitely and positively eliminated. At the same time, because of the ability of the arm 102 to give or yield under the force of the torque reactions, the effect of these reactions on the vehicle frame is so reduced as to substantially eliminate their sensible transmission to the frame.

It may be noted incidentally in passing, although well understood in the art, that it is desirable in the design of the above described dampening means that its natural period of vibratory movement should be either lower or higher than any ivbratory movement, or harmonic thereof, set up in the engine 56 due to torque reactions, otherwise such vibratory movements might fall into phase and allow such extreme vibratory movements of the engine to build up as to cause a disadvantage rather than an advantage. From a practical standpoint it requires that the natural period of vibration of the dampening means be lower than the period of vibration in the engine due to torque reactions at the lowest idling speed of the engine.

In Figs. 6 and 7 modified forms of means for resiliently resisting pivotal movement of the lever 102 are illustrated. In Fig. 6 the end of the lever 102 which carries the pin 110 in the previously described construction is modified to provide oppositely disposed generally horizontal spring seats, each of which is provided with a centrally located perpendicularly disposed projecting pin 152 for locating and holding the corresponding end of a coil spring 154. Each of the springs 154 is maintained in compressed position between the corresponding seat 150 and an opposed seat member 156 vertically displaced therefrom and adjustably carried on the end of a screw 158 threaded through the corresponding flange of the frame side member 50 and locked in adjusted position by means of a nut 160. It will be obvious that the result of this construction is identical to that previously described.

In Fig. 7 the end of the arm 102 which is shown provided with a pin 110 in the first described construction, is modified to provide upwardly and downwardly opening cup-shaped sockets 162, and screws 164 threaded through the flanges of the frame side member 50 in opposed relation thereto are provided at their inner ends with oppositely opening cup-shaped socket members 166. Between each socket 162 and opposed socket member 166 a block 168 of rubber is maintained under a compressive force. The amount of such force may be varied by threading the screws 164 in or out in the corresponding flange of the frame side member 50 and the screws may be locked in adjusted position by means of the nuts 170. The result of this construction is, of course, substantially identical to that previously described.

Various other modifications and changes will be apparent to those skilled in the art after the teachings of the present invention are made known to them and, accordingly, it will be understood that formal changes may be made in the specific embodiments of the invention described without departing from the spirit or substance of the broad invention, the scope of which is commensurate with the appended claims.

I claim:

1. In a motor vehicle, the combination with a chassis frame and an engine mounted therein for driving the vehicle, of means for supporting said engine for limited vibratory movement around a line extending in approximately longitudinal relation with respect to the engine, and means for dampening said movement including an arm rigid with the engine and adapted to vibrate therewith, a movable member carried by said frame and connected with said arm to be vibrated thereby in a path transverse to the plane of vibration of said arm, and means interposed between said member and said frame for cushioning the vibrations of said member.

2. In a motor vehicle, the combination with a chassis frame and an engine mounted therein for driving the vehicle, of means for supporting said engine for limited vibratory movement around the axis of the crank shaft of the engine, and means for reducing the sensible effects of said vibrations in said frame including an arm rigid with the engine and adapted to vibrate therewith, a movable member secured to said frame and connected with said arm to be vibrated thereby in an approximately vertical plane transverse to the length of said arm, and resilient means interposed between said movable member and said frame opposing movement of said movable member.

3. In a motor vehicle, the combination with a chassis frame and an engine mounted therein for driving the vehicle, of means for supporting said engine for limited vibratory movement around the axis of the crank shaft of the engine, said means including two arms extending laterally from the engine toward the side members of said frame, rockers supporting said arms, means supporting said rockers on said frame for vibratory movement in vertical planes transverse to the length of said arms, and means interposed between said rockers and said frame for cushioning the vibratory movement of said rockers.

4. A construction according to preceding claim 3 in which said cushioning means consists of opposed springs acting on each rocker.

5. In a motor vehicle, the combination with a chassis frame and an engine mounted therein for driving the vehicle, of means for supporting said engine for limited vibratory movement around the axis of the crank shaft of the engine, and means for limiting said movement including two arms extending laterally from the engine toward the side members of said frame, rockers mounted on said side frame members for supporting said arms, and resilient means acting on said rockers for holding them normally in approximately predetermined positions but adapted to yield to absorb the vibratory movements of said rockers imparted to them by said arms.

6. An arrangement according to preceding claim 5 in which resilient cushioning means is interposed between said rockers and said arms.

7. An arangement according to preceding claim 5 in which resilient cushioning means is provided to support said rockers in addition to the previously mentioned resilient means for absorbing the vibrations of said rockers.

8. In a motor vehicle, in combination, a frame having side rails, an engine supported on said frame for pivotal movement about a line extending longitudinally thereof, and means connecting said engine with said frame for limiting said pivotal movement thereof including an arm movable in accordance with said pivotal movement of said engine, and means supported by one of said side rails connected to said arm and converting the force of such movement into a couple acting in an approximately vertical plane.

9. In a motor vehicle, in combination, a frame having side rails, an engine supported in said frame for movement about a line extending longitudinally thereof, a double armed lever pivotally mounted between its ends on one of said side rails, yieldable means associated between one end of said lever and said side rail constantly urging said lever towards a predetermined pivotal position, and an arm movable in response to pivotal movements of said engine operatively connected to the other end of said lever.

10. In a motor vehicle, in combination, a frame, an engine mounted in said frame for pivotal movement about a line extending longitudinally of said engine, means connected to said engine and projecting laterally therefrom adapted to be moved in accordance with pivotal movements of said engine, means movably supported by said frame interconnecting the first mentioned means therewith, and means coacting between said frame and the second mentioned means resisting relative movement of the latter whereby forces tending to cause pivotal movements of said engine will be resisted in said frame by forces tending to rotate said frame about an axis transverse to the length thereof.

11. In combination, an internal combustion engine and a support, a plurality of mounting members connecting the engine and support so constructed and arranged as to permit rocking movement of the engine relative to the support, at least a portion of said members being so constructed and arranged as to transform rocking vibratory forces in said engine into couples in said support acting in a substantially vertical plane approximately parallel to the longitudinal axis of the engine.

12. In combination, an internal combustion engine and a supporting frame having side rails, a plurality of members connecting the engine and frame so constructed and arranged as to permit rocking movement of the engine relative to the support, at least a portion of said members each including an arm pivotally mounted on a side rail of said frame for rocking movement in a plane extending in approximately longitudinally parallel relation with respect thereto and so constructed and arranged as to yieldably resist said rocking movement of said engine.

13. In combination, an internal combustion engine and a supporting frame having side rails, a plurality of members connecting the engine and frame so constructed and arranged as to permit rocking movement of the engine relative to the support, at least a portion of said members each including an arm pivotally mounted on a side rail of said frame for rocking movement in a plane extending in approximately longitudinally parallel relation with respect thereto and so constructed and arranged as to yieldably resist said rocking movement of said engine, and means interconnecting said arm and frame yieldably resisting said rocking movement of said arm.

WILLIAM HAROLD BAGLEY, Jr.